(12) United States Patent
Kawada

(10) Patent No.: US 7,408,575 B2
(45) Date of Patent: Aug. 5, 2008

(54) PHOTOGRAPHING DEVICE INCLUDING IDENTIFYING DATA ACQUISITION DEVICE

(75) Inventor: Yukihiro Kawada, Asaka (JP)

(73) Assignee: Fujifilm Corporation, Tokyo (JP)

( * ) Notice: Subject to any disclaimer, the term of this patent is extended or adjusted under 35 U.S.C. 154(b) by 631 days.

(21) Appl. No.: 10/986,671

(22) Filed: Nov. 12, 2004

(65) Prior Publication Data

US 2005/0104967 A1 May 19, 2005

(30) Foreign Application Priority Data

Nov. 18, 2003 (JP) ............................. 2003-387686
Aug. 12, 2004 (JP) ............................. 2004-235103

(51) Int. Cl.
*H04N 5/76* (2006.01)

(52) U.S. Cl. ................................. 348/231.2; 348/231.3

(58) Field of Classification Search .............. 348/231.2, 348/231.5, 231.3; 386/107, 117
See application file for complete search history.

(56) References Cited

U.S. PATENT DOCUMENTS 6,313,877 B1 * 11/2001 Anderson .............. 348/333.05
7,092,009 B2 * 8/2006 Patel et al. ............... 348/207.1

FOREIGN PATENT DOCUMENTS

JP            3087825        5/2002

* cited by examiner

*Primary Examiner*—Tuan V Ho
(74) *Attorney, Agent, or Firm*—McGinn IP Law group PLLC

(57) ABSTRACT

A photographing device comprising: an imaging device for imaging an object image in accordance with a photographing command; a reading device for reading a picture data recorded in a recording medium in accordance with a reproduction command; a display device for reproducing and displaying the picture data read by the reading device; an identifying data acquisition device for reading unique information attached in a medium and acquiring identifying data unique to the medium; a management information generation device for generating information indicating that an imaged picture data is a picture data corresponding to an identifying data acquired by the identifying data acquisition device when the identifying data are acquired by the identifying data acquisition device after the picture is imaged by the imaging device; a management information storing device for storing information generated as a management information by the management information generation device; and a reproduction control device for reproducing and displaying a corresponding picture data in the display device by acquiring an information of the picture data corresponding to the identifying data acquired by the identifying data acquisition device from the management information being stored in the management information storing device in accordance with a reproduction command after acquiring identifying data by the identifying data acquisition device.

20 Claims, 12 Drawing Sheets

PHOTOGRAPHING DEVICE INCLUDING IDENTIFYING DATA ACQUISITION DEVICE

BACKGROUND OF THE INVENTION

1. Field of the Invention

The present invention relates to a photographing device, and more particularly to a photographing device used in cooperation with a handwriting notebook and a note.

2. Description of the Related Art

When a picture photographed by a camera is recorded with a comment attached thereto, the printed picture has hitherto been pasted to a mount so that a comment is written in a margin part of the mount. In the case of a picture photographed by a digital camera, there is a method in which the picture data are taken into a personal computer, etc. so as to be managed by means of the album software, and the like (for example, Japanese Utility Model Registration No. 3087825, etc.).

SUMMARY OF THE INVENTION

However, the method in which a photographed picture is printed and pasted to a mount so as to allow a comment to be attached and in which a photographed picture is taken into a personal computer so as to be managed, has a disadvantage of lacking in the immediacy and the user-friendliness.

The present invention is made in view of the above circumstances, and has its object to provide a photographing device for facilitating management of photographed pictures.

In order to accomplish the aforementioned object, a first aspect of the present invention provides a photographing device comprising: an imaging device for imaging an object image in accordance with a photographing command; a reading device for reading a picture data recorded in a recording medium in accordance with a reproduction command; a display device for reproducing and displaying the picture data read by the reading device; an identifying data acquisition device for reading unique information attached in a medium and acquiring identifying data unique to the medium; a management information generation device for generating information indicating that an imaged picture data is a picture data corresponding to an identifying data acquired by the identifying data acquisition device when the identifying data are acquired by the identifying data acquisition device after the picture is imaged by the imaging device; a management information storing device for storing information generated as a management information by the management information generation device; and a reproduction control device for reproducing and displaying a corresponding picture data in the display device by acquiring an information of the picture data corresponding to the identifying data acquired by the identifying data acquisition device from the management information being stored in the management information storing device in accordance with a reproduction command after acquiring identifying data by the identifying data acquisition device.

According to the first aspect of the present invention, when unique information attached to a medium is read by the identifying data acquisition device and identifying data unique to the medium are acquired and thereafter a picture is imaged by the imaging device, information is generated by the management information generation device, which information indicates that the imaged picture data correspond to the identifying data acquired by the identifying data acquisition device. The generated information is stored as management information by the management information storing device. When unique information attached to a medium is read by the identifying data acquisition device and the identifying data unique to the medium are acquired and thereafter reproduced, picture data corresponding to the identifying data acquired by the identifying data acquisition device are acquired from the management information stored in the management information storing device. Then, corresponding picture data are reproduced and displayed in the display device. Thereby, the picture can be recorded and reproduced in association with the medium.

In order to accomplish the aforementioned object, a second aspect of the present invention provides a photographing device comprising: an imaging device for imaging an object image in accordance with a photographing command; a reading device for reading a picture data recorded in a recording medium in accordance with a reproduction command; a display device for reproducing and displaying the picture data read by the reading device; an identifying data acquisition device for reading unique information attached to a medium and acquiring identifying data unique to the medium; a picture selection device for selecting an arbitrary picture data from the picture data reproduced and displayed in the display device; a management information generation device for generating information indicating that a selected picture data is the picture data corresponding to the identifying data acquired by the identifying data acquisition device when acquiring the identifying data by the identifying data acquisition device and thereafter selecting the picture data by the picture selection device; a management information for storing device for storing an information generated by the management information generation device as management information; and a reproduction control device for reproducing and displaying a corresponding picture data in the display device by acquiring an information of the picture data corresponding to the identifying data acquired by the identifying data acquisition device from the management information being stored in the management information storing device in accordance with a reproduction command after acquiring identifying data by the identifying data acquisition device. Thereby, a picture can be recorded and reproduced in association with a medium.

According to the second aspect of the present invention, when a unique information attached to a medium is read by the identifying data acquisition device and identifying data unique to the medium is acquired and thereafter a photographed picture is selected by the picture selection device, the management information generation device generates information indicating that the selected picture data are the data corresponding to the identifying data acquired by the identifying data acquisition device. The generated information is stored as management information in the management information storing device. When unique information attached to a medium is read by the identifying data acquisition device and the identifying data unique to the medium are acquired and then reproduced, picture data corresponding to the identifying data acquired by the identifying data acquisition device are acquired from the management information stored in the management information storing device. Then, corresponding picture data are reproduced and displayed in the display device.

In order to accomplish the aforementioned object, third and forth aspects of the present invention provide the photographing device according to first or second aspects of the invention wherein the medium is each page in a memo pad.

According to the third aspect, information can be attached to each page of the memo pad, enabling a picture to be recorded and reproduced in association with each page of the memo pad.

Further, in order to accomplish the aforementioned object, fifth and sixth aspects of the present invention provide a photographing device according to third and forth aspects of the present invention wherein the management information storing device is a wireless tag provided for the memo pad.

Additionally, in order to accomplish the aforementioned object, seventh and eighth aspects of the present invention provide a photographing device according to fifth and sixth aspects of the present invention further comprising: a wireless tag reading device for reading the management information from the wireless tag in the photographing device; and a wireless tag writing device for writing the management information into the wireless tag.

According to the fourth aspect of the present invention, a memo pad is provided with a wireless tag in which management information is recorded.

Further, in order to accomplish the aforementioned object, ninth and tenth aspects of the present invention provide a photographing device according to first and second aspects of the invention wherein an information attached to the medium is a bar code, and the identifying data acquisition device comprises the imaging device for imaging the bar code and a decoding device for decoding the bar code imaged by the imaging device.

According to the fifth aspect of the present invention, identification information attached to the medium is imaged by the imaging device and decoded by the decoding device, thereby enabling the identification information attached to the medium to be acquired.

According to the present invention, it is possible to recode and reproduce in association with the medium, so it is easy to manage the pictures.

DETAILED DESCRIPTION OF THE PREFERRED EMBODIMENTS

The best mode for carrying out a photographing device according to the invention is described as follows with reference to the attached drawings.

Figure 1:
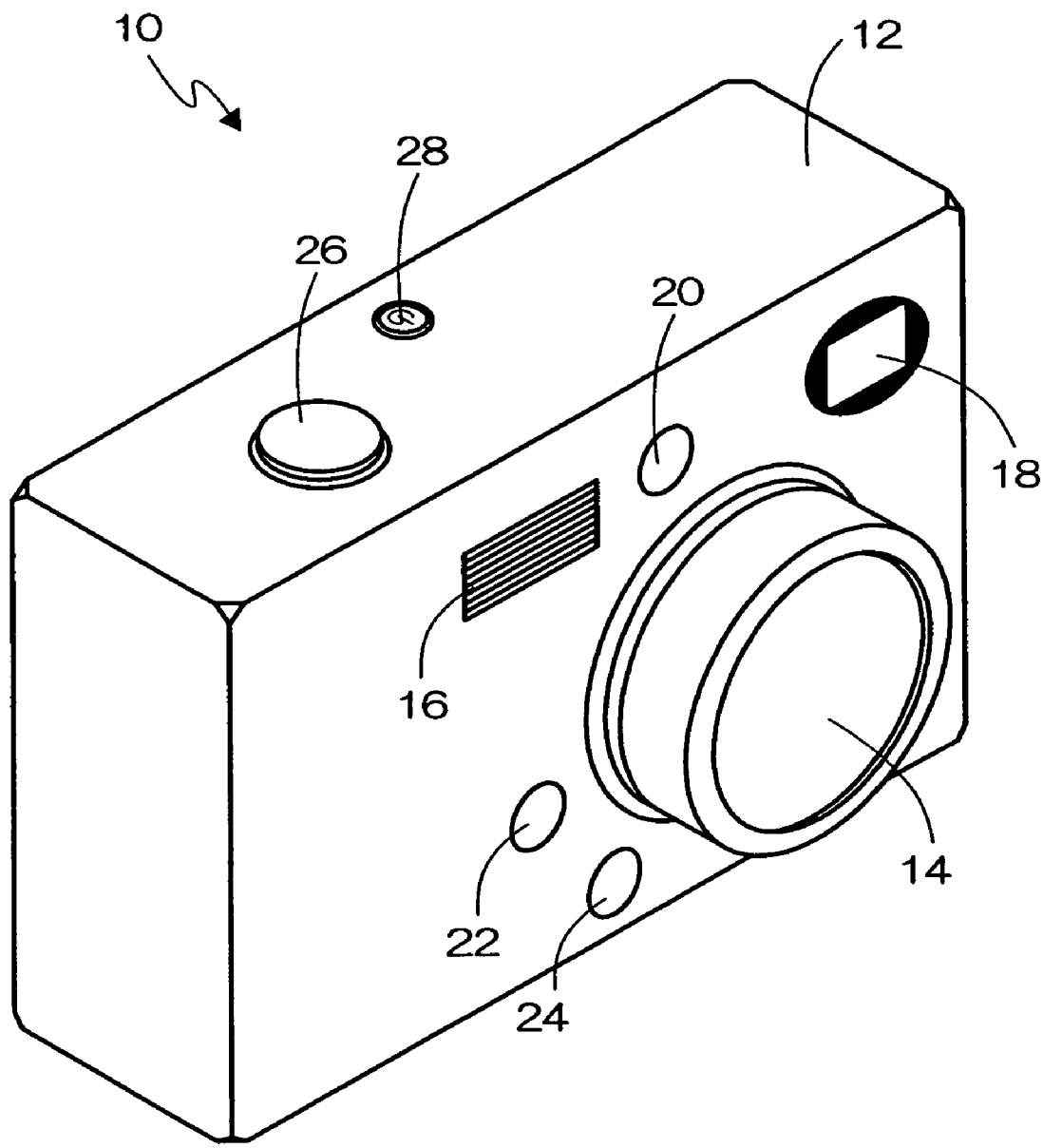
FIG. 1 is a front perspective view of a digital camera.
Figure 2:
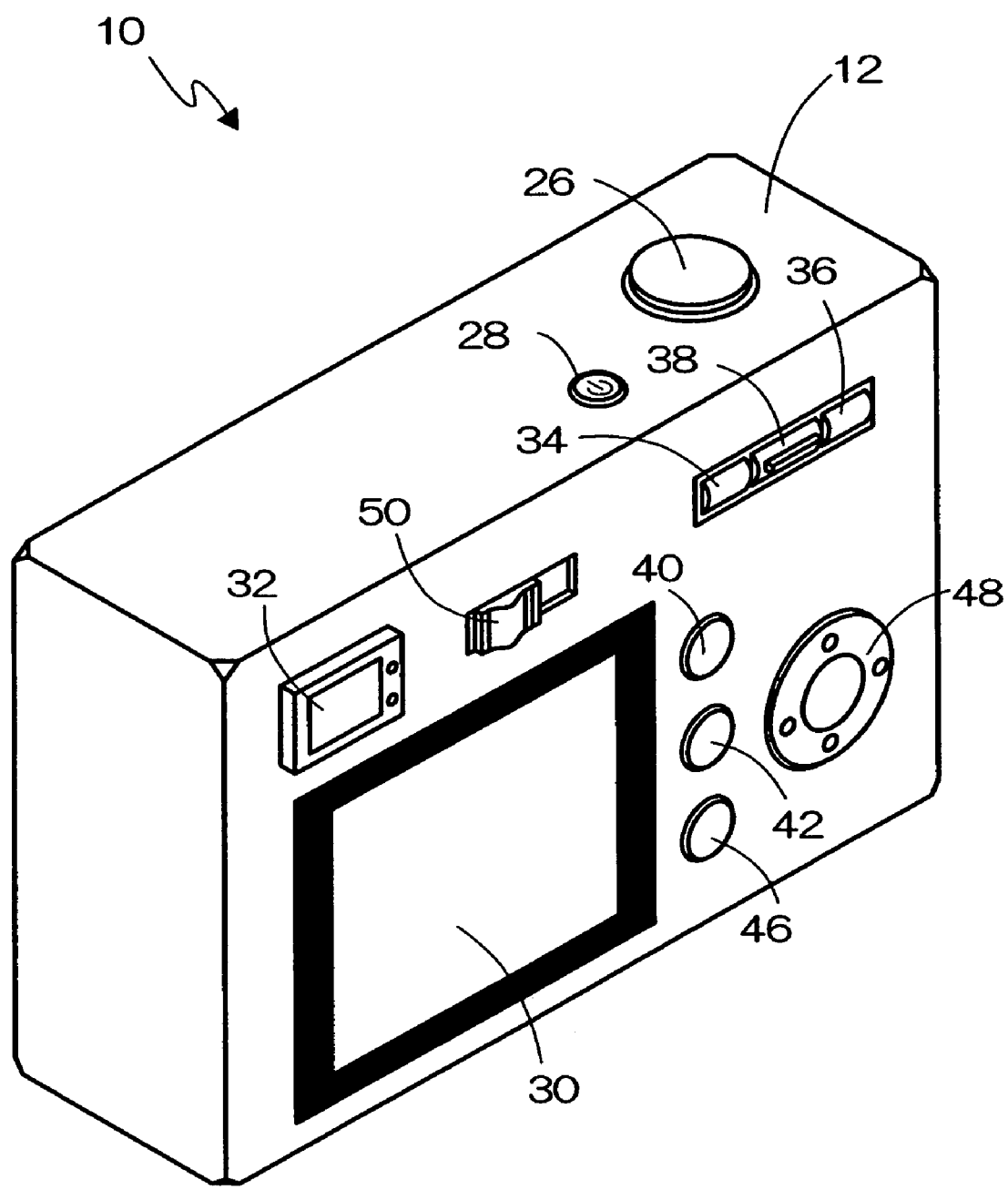
FIG. 2 is a rear perspective view of a digital camera.

FIG. 1 and FIG. 2 are a plan perspective view and a rear perspective view showing an embodiment of a digital camera 10 to which the present invention is applied, respectively.

As shown in FIG. 1, a lens 14, a stroboscope 16, the viewfinder window 18, and a self timer lamp 20, etc. are provided on a front face of a camera body 12, and a release button 26 and a power supply button 28, etc. are provided on the upper face.

As shown in FIG. 2, on the rear face of the camera body 12, there are provided a monitor 30, a finder eyepiece section 32, a stroboscopic button 34, a macro button 36, a zoom lever 38, a display button 40, a BACK button 42, a menu/OK button 46, a cross button 48, and a mode switch 50, etc.

The lens 14 is constructed of a collapsible mount type zoom lens and extended up from the camera body 12 when the mode of the camera is set to a photography mode and the power supply is switched on.

The monitor 30 is constructed of a liquid crystal display capable of performing full color display, and recorded images are reproduced and displayed in the monitor 30. The monitor 30 is also used as a display for the user interface and displays a through image at the time of photographing so as to be used as an electronic viewfinder.

The stroboscopic button 34 functions as a button for instructing switching of the strobe mode. Each time when the stroboscopic button 34 is depressed, the strobe mode during photographing is switched sequentially from "automatic strobe" to "red-eye reducing strobe" and then to "forced flashing strobe" and then to "slow synchro" and then to "strobe light emission inhibition".

The macro button 36 functions as a button for instructing switching of ON/OFF of a macro function, and each time when the macro button 36 is depressed, ON/OFF of the macro function during photographing is switched over.

The zoom lever 38 functions as a button for instructing zoom (tele/wide) of a photographic picture at the time of photographing and also functions as a button for instructing zoom (enlarging/reducing) of a display picture at the time of reproduction. The zoom lever 38 is provided in a vertically swingable manner, the upward operation of which allows zooming to be operated toward the tele side, and the downward operation of which allows zooming to be operated toward the wide side.

The display button 40 functions as a button for instructing switching of display in the monitor 30 and each time when the button is depressed, the through image displayed in the monitor 30 is turned on and turned off. In addition, when the display button is depressed during reproduction, switching from the normal reproduction to the reproduction without character display and to the multi reproduction is effected.

The menu/OK button 46 functions as a button (menu button) for instructing shift from a normal screen of each mode to a menu screen and as a button (OK button) for instructing fixing and execution of a selected content. The BACK button 42 functions as a button for instructing cancellation of the input operation, etc.

The cross button 48 functions as a button for inputting an instruction in the four directions (up/down/left/right directions) and is used in selection of a menu item etc. in the menu screen.

The mode switch 50 functions as a switch for instructing switching of the mode of the camera. Sliding operation of the mode switch 50 makes the mode of the camera set to "photography mode" or "reproduction mode".

Figure 3:
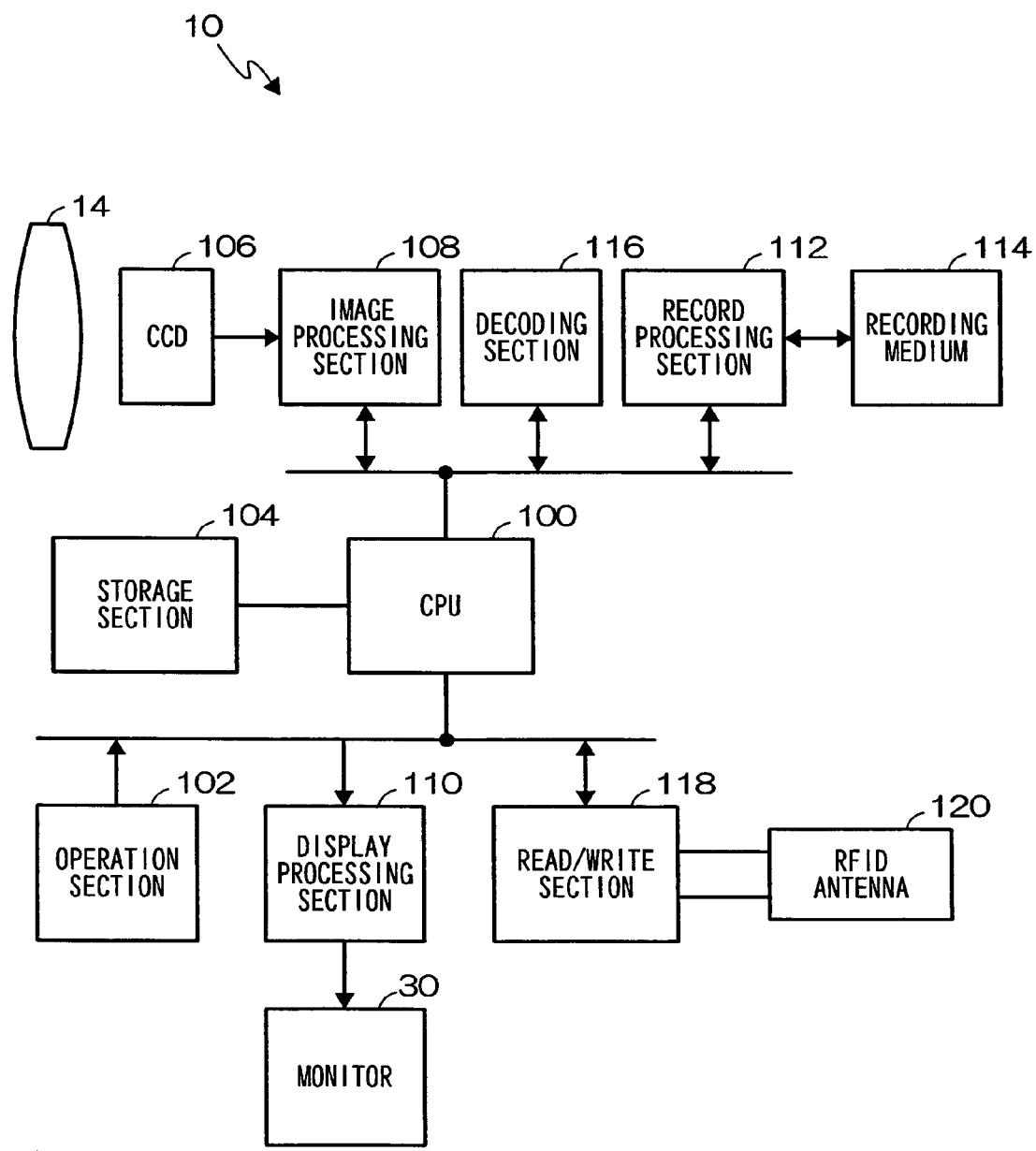
FIG. 3 is a block diagram showing schematic configuration inside the digital camera.

FIG. 3 is a block diagram showing a schematic configuration inside the digital camera 10 shown in FIGS. 1 and 2.

As shown in the figure, the digital camera 10 is constructed of a CPU 100, a operation section 102, the storage section 104, an imaging pickup device 106, a image processing section 108, a display processing section 110, a record processing section 112, a recording medium 114, the decoding section 116, and a read/write section 118, etc.

The CPU 100 is a control section performing an overall control of the camera system and performs an overall control of operation of the camera as a whole based on the operation signal from the operation section 102 (the release button 26, the power supply button 28, the stroboscopic button 34, the macro button 36, the zoom lever 38, the display button 40, the BACK button 42, the menu/OK button 46, the cross button 48, and the mode switch 50, etc.).

The storage section 104 includes a ROM, a RAM, and an EEPROM, and various data required for a program processed by the CPU 100 and a control are stored in the ROM. The RAM is used as an expansion area of the program, and is used as a work area by the CPU 100 for performing various data processing etc. The EEPROM also stores various setting information etc.

The image pickup device (CCD) 106 converts an optical image of an object whose image is formed by the lens 14 into an electric signal.

The image processing section 108 takes in an electric signal outputted from the CCD 106, and the electric signal is subjected to a necessary signal processing so as to be converted into a picture signal.

When making on the monitor 30 display a through image during photographing, the picture signal processed in the image processing section 108 is sent to the display processing section 110. The display processing section 110 converts the inputted picture signal into a signal format for display (for example, NTSC), and outputs it to the monitor 30. Thereby, the real-time picture (through image) captured by the CCD 106 is displayed in the monitor 30.

When the release button 26 is depressed with the mode of the camera set to the photography mode by the mode switch 50, a release signal is outputted from the operation section 102 to the CPU 100. The CPU 100 performs recording processing of a picture in response to the release signal. In other words, an electric signal for one frame portion which is taken in from the CCD 106 is subjected to necessary signal processing in the image processing section 108 for obtaining a picture signal for the one frame portion, so that the picture signal is recorded in the recording medium 114 via the record processing section 112.

The record processing section 112 includes a compression/expansion processing circuit, compresses a picture signal according to a command from the CPU 100 to an image file of a predetermined format, and attaches a predetermined file name to the image file and record it in the recording medium 114. The recording medium 114 may be a recording medium (internal memory) of a built-in type other than an attachable/detachable removable media such as a xD picture card™, a SmartMedia™, a CompactFlash™, a magnetic disk, an optical disk, a magneto optical disk, a memory stick™, and the like.

Setting the mode of the camera to the reproduction mode enables a picture recorded in the recording medium 114 to be reproduced.

When the mode of the camera is set to the reproduction mode by the mode switch 50, the CPU 100 detects the setting and reads out the picture data in the image file, which were finally recorded in the recording medium 114. The read picture data are subjected to necessary expansion processing in the display processing section 110 and thereafter outputted to the monitor 30 via the display processing section 110, thereby enabling the browsing of the pictures recorded in the recording medium 114.

Feeding of the picture frame is performed by the cross button 48, and the following picture is displayed in the monitor 30 if right key in the cross button 48 is depressed upon. If left key in the cross button 48 is depressed upon, the previous picture is reproduced and displayed in the monitor 30.

Figure 4:
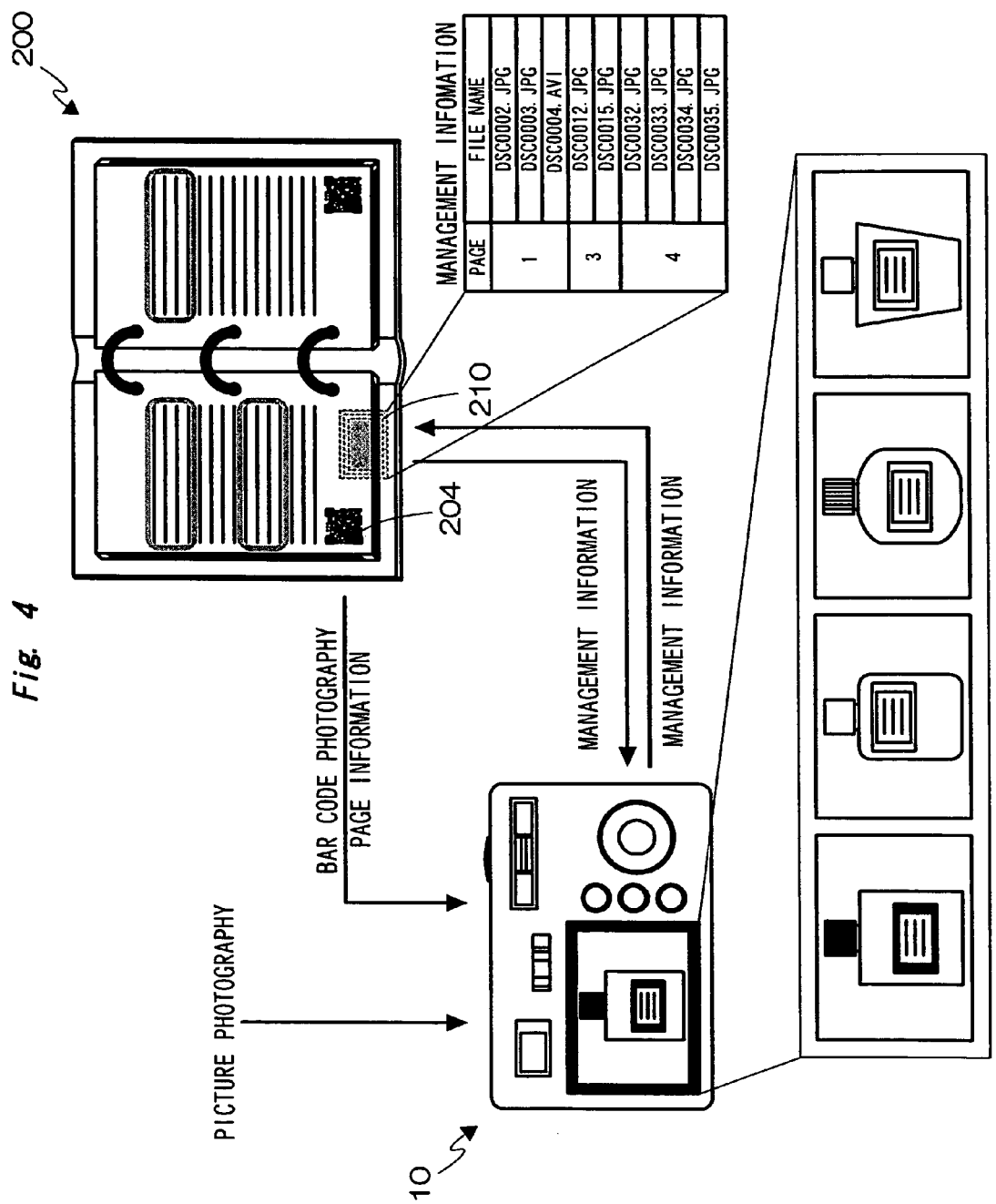
FIG. 4 is a configuration diagram of digital camera and system used in cooperation with a notebook.

As described above, the digital camera 10 of the embodiment according to the present invention is able to perform a recording/reproduction of a picture, and is also provided with a recording/reproduction function cooperating with a notebook as a function for expanding the recording/reproduction function. The function, as shown in FIG. 4, enables storing in association with each page of a notebook 200, and is configured as follows.

Figure 5:
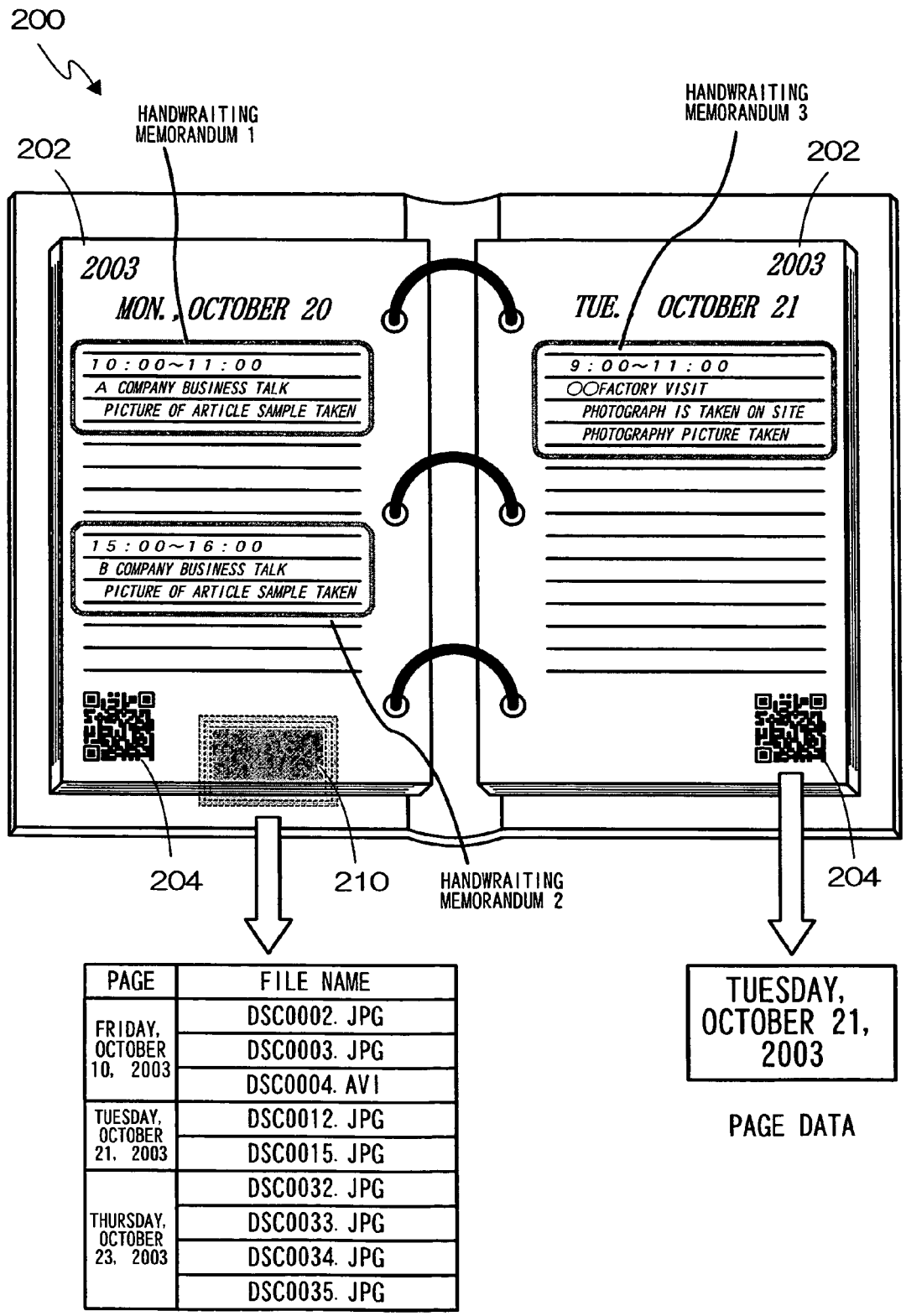
FIG. 5 is a plan view of the notebook.

FIG. 5 is a plan view of the notebook 200 used in cooperation with the digital camera 10 of the embodiment according to the present invention.

As shown in the figure, the notebook 200 is configured as a system notebook capable of replacing papers (refills) 202 to which two dimensional bar codes (QR code) 204 encoding the information (here date) for specifying a page are attached. The two dimensional bar code 204 is read by the digital camera 10. In other words, when the digital camera 10 is set to a condition to enable reading of the two dimensional bar code and the two dimensional bar code 204 is imaged under the condition, the imaged picture of the two dimensional bar code 204 is captured into the decoding section 116 and is decoded by the decoding section 116. The data (herein date) decoded by the decoding section 116 is acquired as a page data of the notebook 200, and is stored in the EEPROM of the storage section 104.

Figure 6:
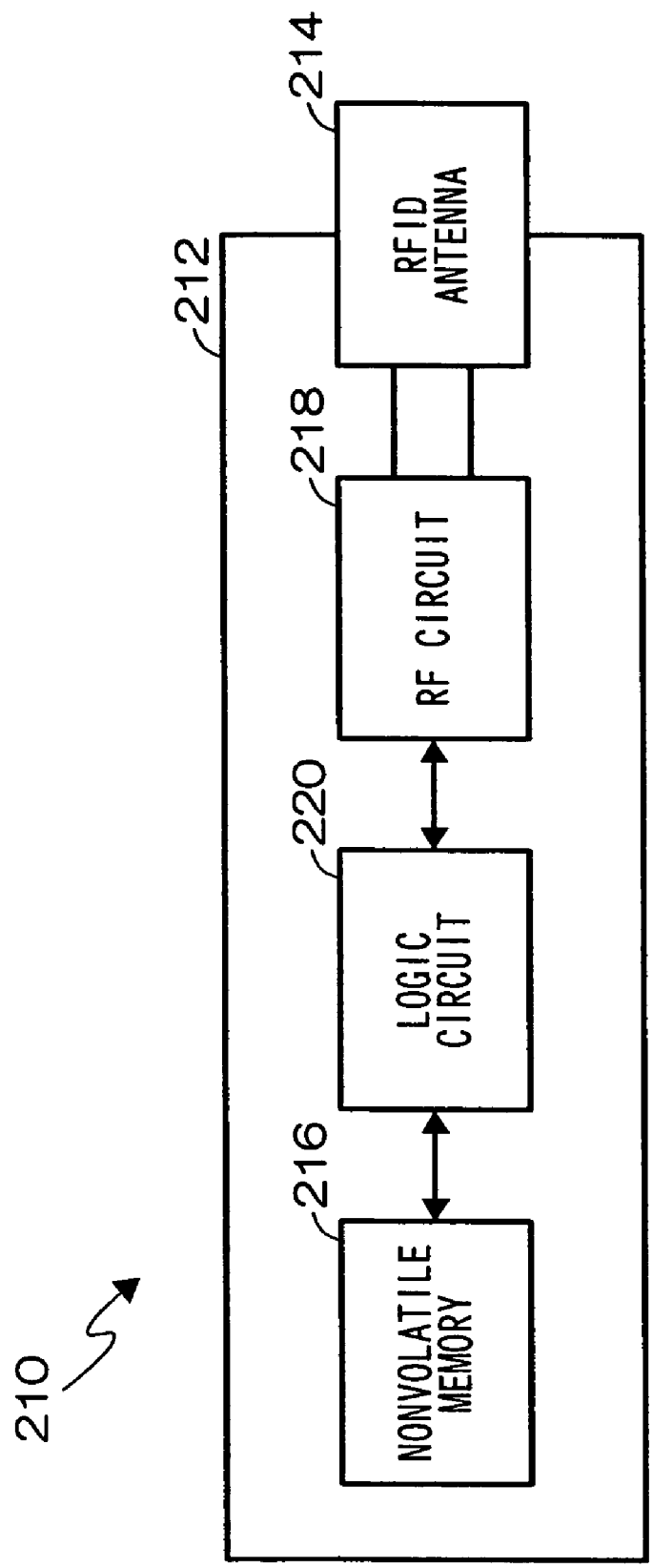
FIG. 6 is a block diagram showing configuration of a wireless tag.

In addition, a wireless tag 210 is embedded in the cover of the notebook 200. As shown in FIG. 6, the wireless tag 210 is a communication module comprising a wireless communications IC 212 and a RFID antenna 214 for communication, and may be referred to as an RFID tag, a non-contact ID tag, a wireless ID tag, etc. In the IC portion of the wireless tag 210, there are integrated a nonvolatile memory 216 for storing data, a RF circuit 218 for wireless communication and a logic circuit 220 for connecting the nonvolatile memory 216 with the RF circuit 218. In the nonvolatile memory 216, the file name of the picture file associated with each page of the notebook 200 is recorded as management information. In other words, as shown in FIG. 5, a list (management information) for associating the page number of the notebook 200 with the file name of the picture file related with the page number is recorded in the nonvolatile memory 216.

The read/write of the management information from/to the wireless tag 210 is performed by the read/write section 118 provided for the digital camera 10.

As shown in FIG. 3, the read/write section 118 sends a radio wave from a RFID antenna 120 in accordance with a command from the CPU 100, and transmits data to the wireless tag 210. The wireless tag 210 analyzes and executes the received command, and returns a response to the read/write section 118. At this time, the wireless tag 210 generates an electric power based on the electromagnetic induction from the received radio wave, and operates each component circuit.

Thus, management information is written into and read out of the wireless tag 210 by the read/write section 118 of the digital camera 10.

Figure 7:
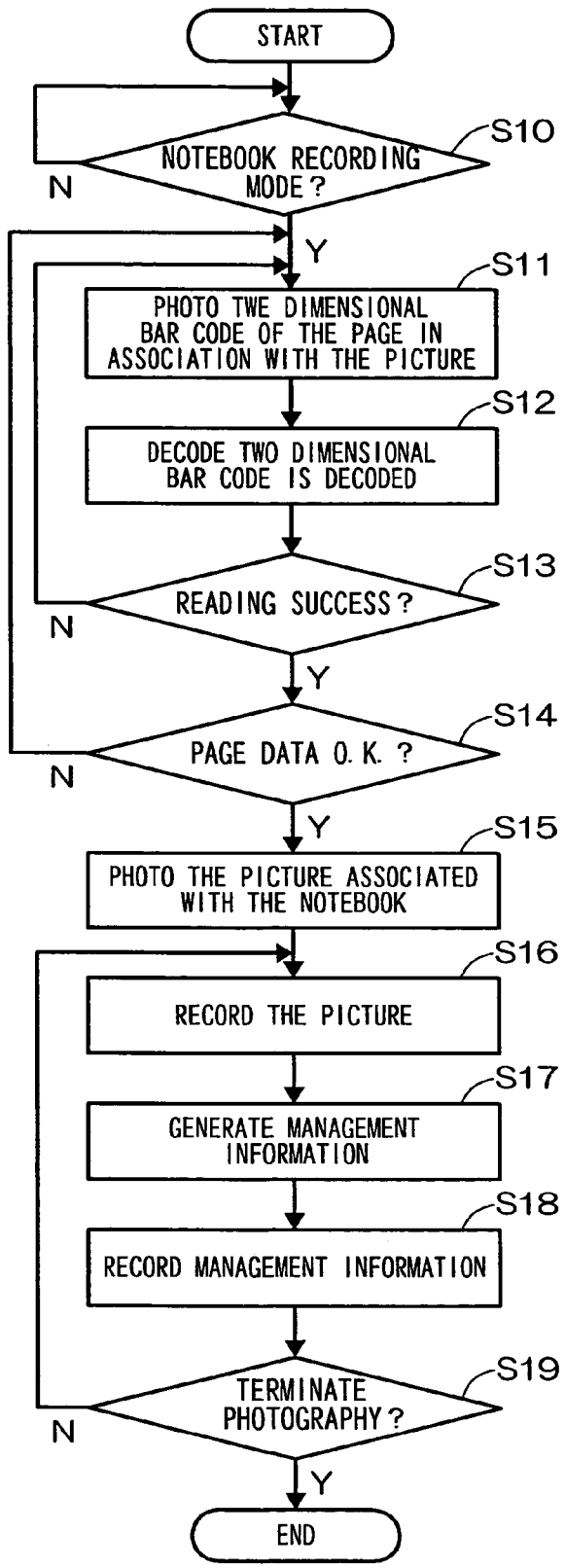
FIG. 7 is a flow chart showing a procedure at the time of recording a picture in association with a notebook.

Next, the procedure at the time of recording a picture in association with each page of the notebook 200 is explained in accordance with a flow chart shown in FIG. 7.

In order to record a picture in association with the notebook 200, mode of the camera is set to the notebook recording mode under the photography mode. The setting of the notebook recording mode is performed in the photography menu.

Figure 8A:
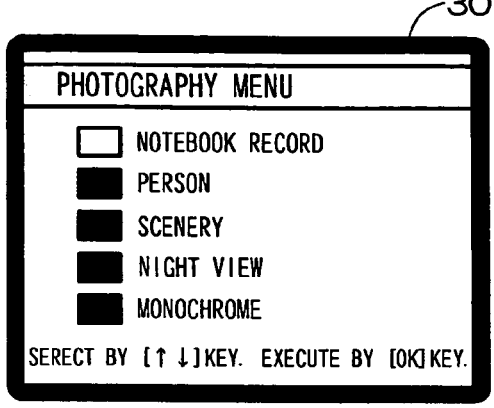
FIGS. 8A to 8E are figures showing an example of screen display of a monitor in the notebook recording mode.

First, mode of the camera is set to the photography mode by the mode switch 50, and the menu/OK button 46 is depressed. Thereby, a screen display of the photography menu is displayed in the monitor 30, as shown in FIG. 8A. Here, it is assumed that as the photography menu, there are prepared the following five items: "notebook record" for performing recording in association with the notebook, "person" for performing person photography, "scenery" for performing scenery photography, "night view" for performing night view photography, and "monochrome" for performing monochrome photography. A user selects "notebook record" from the items of the photography menu. The selection of the item is performed by the upper and lower keys of the cross button 48, and when the cross button 48 is operated, the cursor showing the selection item moves. Then, selection is determined by the menu/OK button 46.

The CPU 100 determines the selection of "notebook record" when "notebook record" is selected by depressing the cursor and the menu/OK button 46 (step S10), and shifts the mode of the camera to the notebook recording mode.

Figure 8D:
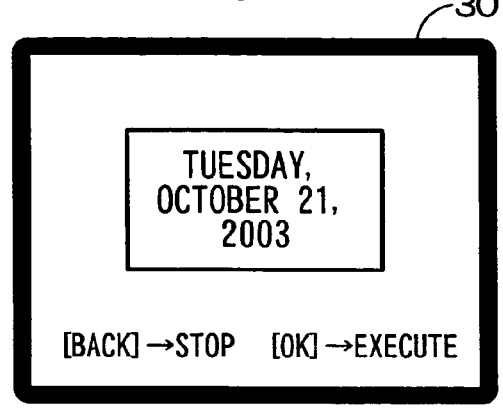
Figure 8B:
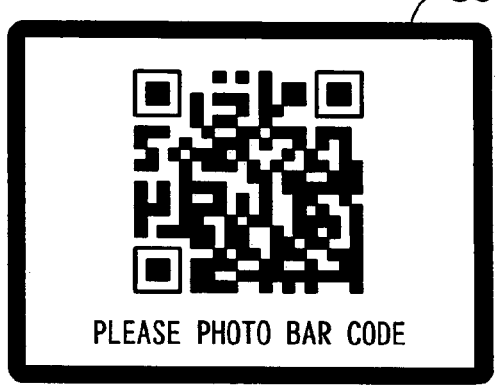

The shift of mode of the camera to the notebook recording mode enables the digital camera 10 to perform bar code reading, a message requiring photographing of the two dimensional bar code ("Please photo bar code") is displayed in the monitor 30, as shown in FIG. 8B. The user photographs the two dimensional bar code 204 of the page to be recorded in association with a picture in accordance with the message (step S11).

By way of the image processing section 108, the picture data of the photographed two dimensional bar code 204 is taken into the decoding section 116 and are decoded (step S12).

The CPU 100 discriminates whether the photographed two dimensional bar code 204 successfully is decoded in the decoding section 116 (step S13), and the CPU 100 stores the decoded data as a page data in the EEPROM of the storage section 104, in the case of successful decoding.

Figure 8E:
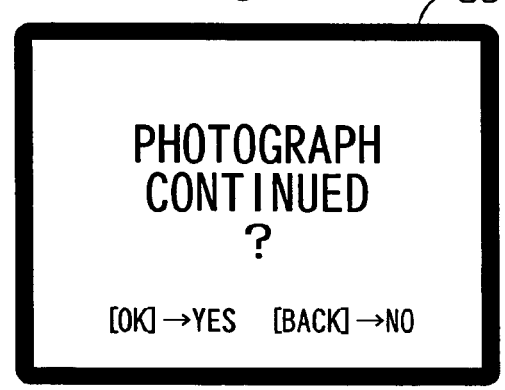
Figure 8C:
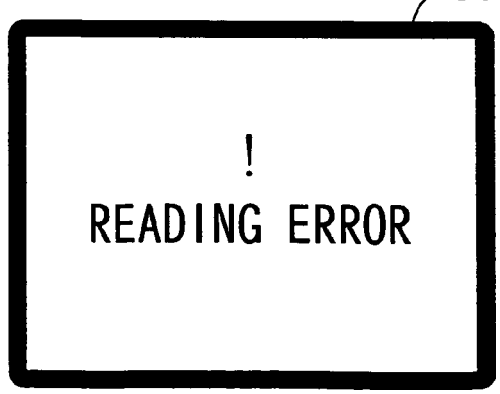

On one hand, in the case of unsuccessful decoding, an error message ("Reading error!") is displayed in the monitor 30 as shown in FIG. 8C, and photographing of the two dimensional bar code is required again. The user photographs the two dimensional bar code again in accordance with the message.

On the other hand, when the page data is successfully acquired, as shown in FIG. 8D, the contents (herein date) of the read page data is displayed in the monitor 30. The user confirms the display and depresses the menu/OK button 46 when there is no discrepancy in the content of the page data in association with photographing, and depresses the BACK button 42 when there is a discrepancy.

The CPU 100 discriminates which of the menu/OK button 46 and the BACK button 42 is depressed (step S14), and when the BACK button 42 is depressed, returns to step S11 so as to photograph again the two dimensional bar code 204.

On the other hand, when the menu/OK button 46 is depressed, a picture in association with the notebook 200 is photographed (step S15).

Photographing is performed by the same operation as the normal photographing, and is performed by depressing of the release button 26. The photographed picture, to which a predetermined file name is attached, is recorded in the recording medium 114 (step S16).

The CPU 100 generates management information from the file name of the photographed picture and the page data acquired from the two dimensional bar code (step S17). In other words, a list is created, which associates the file name of the photographed picture with the page data acquired from the two dimensional bar code as shown in FIG. 5.

In addition, the generated management information is written into the wireless tag 210 provided for the notebook 200 (step S18). In other words, the management information is transmitted to the wireless tag 210 via the read/write section 118, so as to be recorded in the nonvolatile memory 216 of the wireless tag 210.

When such photographing is performed, the photographed picture is recorded in the recording medium 114 while the management information is generated simultaneously, and is written into the wireless tag 210.

Thereafter, a message ("Is photographing continued?") asking whether photographing is continued or not, is displayed in the monitor 30 as shown in FIG. 8E. In accordance with the message, the user depresses the menu/OK button 46 when photographing is continued, and depresses the BACK button 42 when the photographing is discontinued.

The CPU 100 discriminates which of the menu/OK button or the BACK button are depressed, and when the menu/OK button is depressed, the CPU 100 returns to the step S16 and photographs the picture in association with the notebook 200 again.

On the other hand, when the BACK button 42 is depressed, the notebook recording mode is ended, and a shift to the normal photographing mode is affected.

As described above, the digital camera 10 is able to record a picture in association with the notebook 200 when set to the notebook recording mode. After the recording, the user enters a handwritten memorandum into the page associated with the picture, as required.

Figure 9:
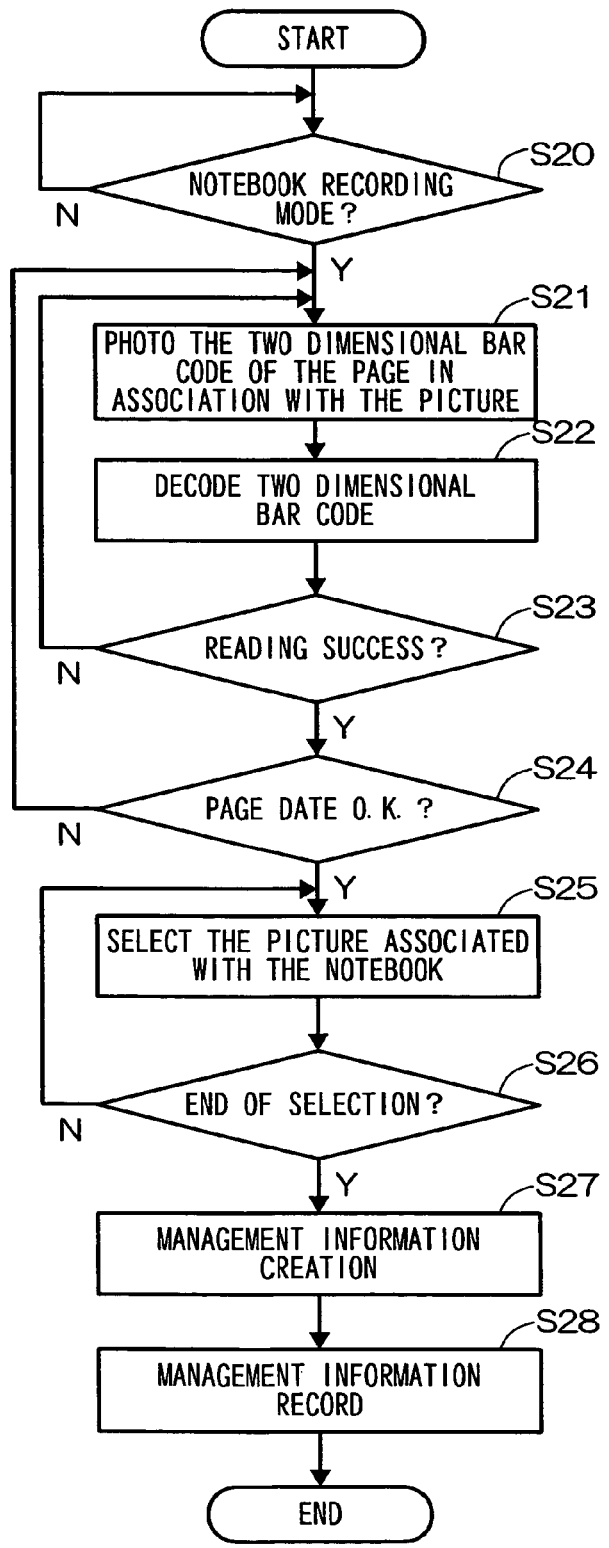
FIG. 9 is a flow chart showing a procedure in the case of associating a photographed picture with a notebook.

Next, the processing procedure, in which a picture is arbitrarily selected from the photographed pictures and is associated with the notebook, is described in accordance with the flow chart shown in FIG. 9.

In order to associate the photographed picture with the notebook 200, mode of the camera is set to the notebook recording mode under the photography mode. The setting of the notebook recording mode is performed in the reproduction menu.

Figure 10A:
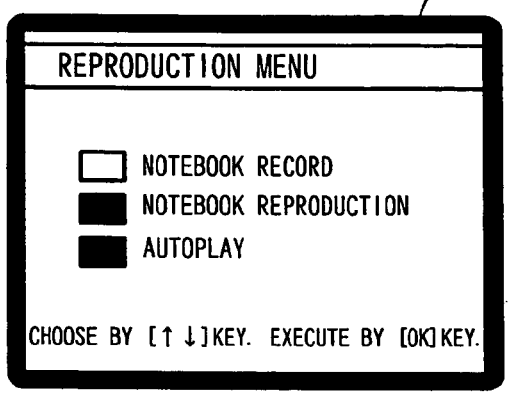
FIGS. 10A to 10F are figures showing examples of screen displays of each monitors in the notebook recording mode.

First, the mode of the camera is set to the reproduction mode by the mode switch 50, and the menu/OK button 46 is depressed. Thereby, the screen display of the photography menu is displayed in the monitor 30 as shown in FIG. 10A. Here, it is assumed that as the photography menu, there are prepared following three items: "notebook record" for associating the photographed picture with the notebook, "notebook image reproduction" for reproducing the picture associated with the notebook, and "AutoPlay" for automatically reproducing all of the recorded pictures. The user selects "notebook record" from the items of the photography menu. The selection of the item is performed by the upper and lower key of the cross button 48, and the cursor indicating a selection item moves when the cross button 48 is operated. Then, the selection is determined by the menu/OK button 46.

The CPU 100 determines the selection of the notebook recording when "notebook record" is selected by the cursor and the menu/OK button 46 is depressed (step S20), and shifts mode of the camera to the notebook recording mode.

Figure 10D:
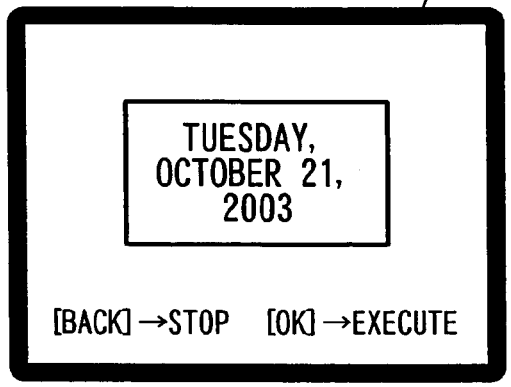
Figure 10B:
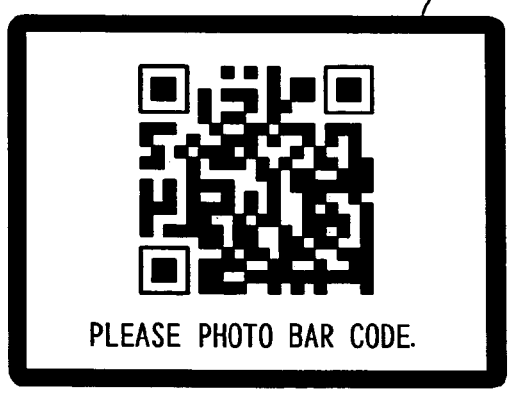

When mode of the camera shifts to the notebook recording mode, the digital camera 10 is enabled to read the bar code, and a message requiring photography of the two dimensional bar code ("Please photo bar code") is displayed in the monitor 30 as shown in FIG. 10B. The user photographs the two dimensional bar code 204 of the page to be recorded in association with a picture in accordance with the message (step S21).

By way of the image processing section 108, the picture data of the photographed two dimensional bar code 204 are taken into the decoding section 116 and decoded (step S22).

The CPU 100 discriminates whether the photographed two dimensional bar code 204 is successfully decoded in the decoding section 116 (step S23) or not, and when the decoding is successfully performed, the CPU 100 stores the decoded data as the page data in the EEPROM of the storage section 104.

Figure 10E:
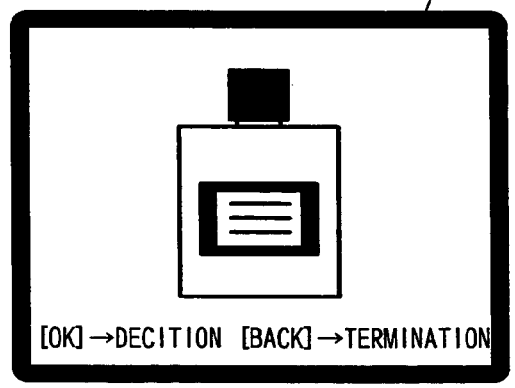
Figure 10C:
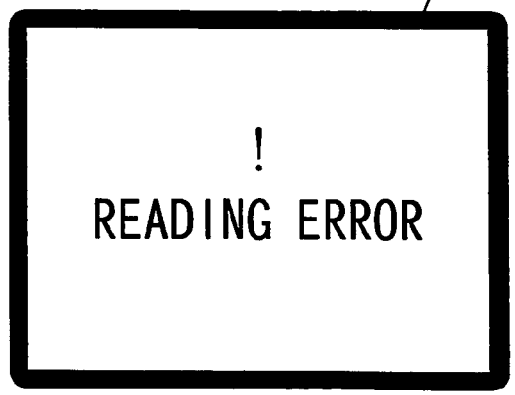

On one hand, when the decoding is unsuccessfully performed, an error message ("Reading error") is displayed in the monitor 30 as shown in FIG. 10C, and photographing of the two dimensional bar code is required again. The user photographs again the two dimensional bar code in accordance with the message.

On the other hand, when the page data is successfully acquired, the contents (herein date) of the read page data are displayed in the monitor 30 as shown in FIG. 10D. The user depresses the menu/OK button 46 when there is no discrepancy in the contents of the page data in association with photographing, and depresses the BACK button 42 when there is a discrepancy.

The CPU 100 discriminates which of the menu/OK button 46 or the BACK button 42 is depressed (step S24), and the CPU 100 returns to step S21 when the BACK button 42 is depressed, then it photographs the two dimensional bar code 204 again.

On the other hand, when the menu/OK button 46 is depressed, the selection of the picture in association with the notebook 200 is performed (step S25). The selection is performed by depressing the menu/OK button 46 when the photographed pictures are reproduced and displayed frame by frame in the monitor 30 so that the picture associated with the notebook 200 is finally reproduced and displayed in the monitor 30 as shown in FIG. 10E.

In this case, like the normal reproduction, the reproduction of the picture is performed in such a manner that the picture finally recorded in the recording medium 114 is displayed in the monitor 30 at first, and feeding step of the picture frame is performed by pressing the right or left key of the cross button 48.

Figure 10F:
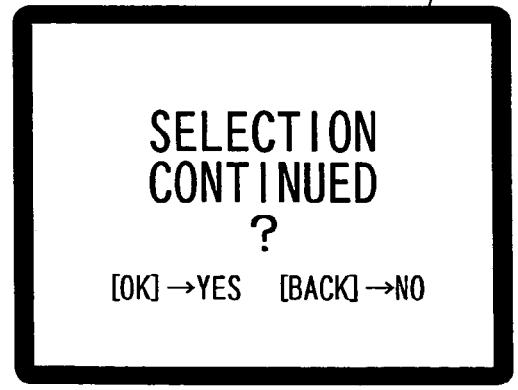

When a picture is selected, a message for asking whether the selection is continued or not ("Is the selection continued?") is displayed in monitor 30 as shown in FIG. 10F. In accordance with the message, the user depresses the menu/OK button 46 when continuing the selection, and the user depresses the BACK button 42 when discontinuing the selection.

The CPU 100 discriminates which of the menu/OK button 46 and the BACK button 42 is depressed (step S26), the CPU 100 returns to step S25 when the menu/OK button 46 is depressed, and once more selects a picture in association with the notebook 200.

On the other hand, when the BACK button 42 is depressed, the CPU 100 generates the management information from the file name of the selected picture of which selection processing has been completed and from the page data acquired from the two dimensional bar code (step S27). In other words, as shown in FIG. 5, a list is created in which the file name of the selected picture is associated with the page data acquired from the two dimensional bar code.

Then, the generated management information is written into the wireless tag 210 provided for the notebook 200 (step S28). In other words, the management information is transmitted to the wireless tag 210 via the read/write section 118, and recorded in the nonvolatile memory 216 of the wireless tag 210.

Thus, the association of the recorded picture is completed. Thereafter, the digital camera 10 completes processing of the notebook recording, and shifts to the usual reproduction mode.

As described above, the digital camera 10 is able to associate a photographed picture with the notebook 200 and is able to record the photographed picture, by setting to the notebook recording mode under the reproduction mode. After recording, the user enters a handwritten memorandum into the page which is made associated with the picture, as required.

Figure 11:
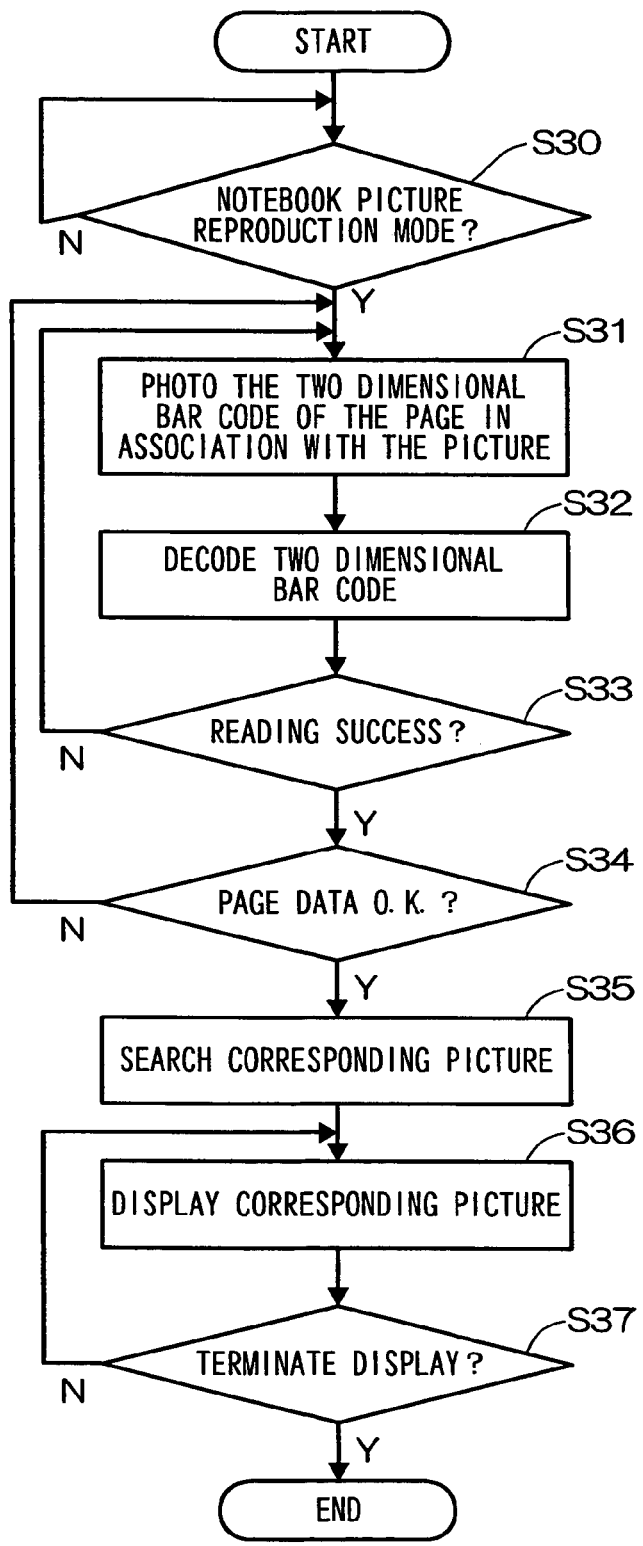
FIG. 11 is a flow chart showing a procedure at the time of reproducing a picture associated with a notebook.

Next, the procedure of enabling the picture recorded in association with each page of the notebook 200 to be reproduced and displayed, is explained in accordance with the flow chart shown in FIG. 11.

In order to reproduce the picture associated with each page of the notebook 200, mode of the camera is set to the notebook picture reproduction mode under the reproduction mode. The setting of the notebook picture reproduction mode is performed in the reproduction menu.

Figure 12A:
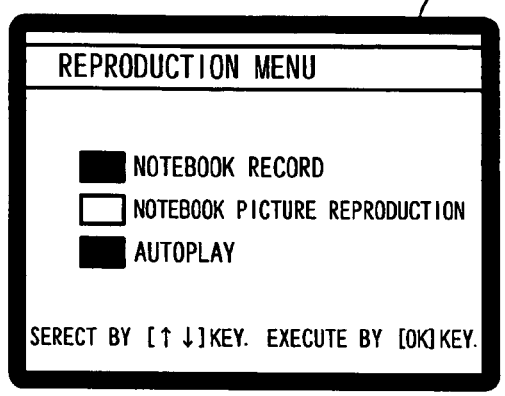
FIGS. 12A to 12E are figures showing examples of screen displays of each monitors in the notebook picture reproduction mode.

First, mode of the camera is set to the reproduction mode by the mode switch 50, and the menu/OK button 46 is depressed. Thereby, the screen display of the photography menu is displayed in the monitor 30 as shown in FIG. 12A. The user selects the "notebook picture reproduction" for reproducing the picture associated with the notebook 200 from the items of the photography menu. The CPU 100 determines the selection of the notebook picture reproduction mode when "notebook picture reproduction" is selected by the cursor and the menu/OK button 46 is depressed (step S30), and shifts the mode of the camera to the notebook picture reproduction mode.

Figure 12D:
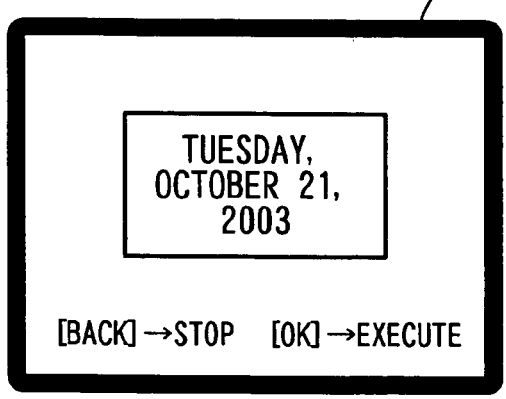
Figure 12B:
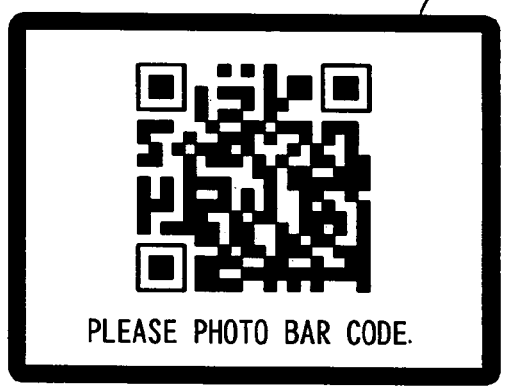
Figure 12E:
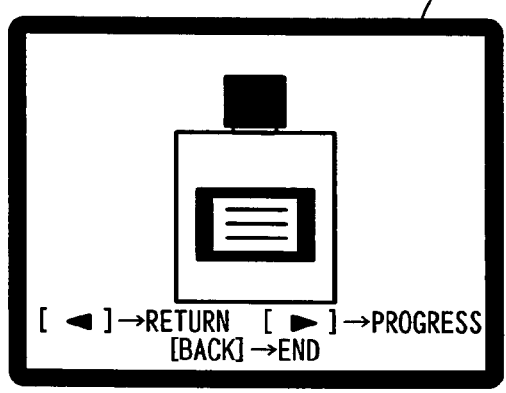

When mode of the camera shifts to the notebook picture reproduction mode, the digital camera 10 is enabled to read the bar code and as shown in FIG. 12B, a message requiring photography of the two dimensional bar code ("please photo bar code") is displayed in the monitor 30. The user photographs the two dimensional bar code 204 of the page of which picture is to be read out, in accordance with the message (step S31).

By way of the image processing section 108, the picture data of the photographed two dimensional bar code 204 are taken in the decoding section 116 and decoded (step S32).

The CPU 100 discriminates whether the photographed two dimensional bar code 204 is successfully decoded in the decoding section 116 (step S33) or not, and the decoded data are stored as the page data in the EEPROM of the storage section 104 when successfully decoded.

Figure 12C:
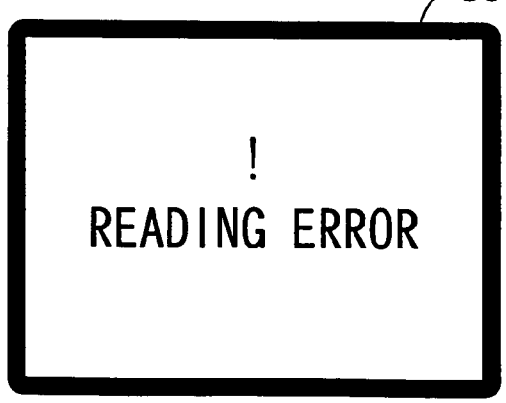

On one hand, when unsuccessfully decoded, an error message ("Reading error"!) is displayed in the monitor 30 as shown in FIG. 12C, and the photography of the two dimensional bar code is required again. The user photographs again the two dimensional bar code in accordance with the message.

On the other hand, when the page data is successfully acquired, the contents (herein date) of the read page data are displayed in the monitor 30 as shown in FIG. 12D. The user depresses the menu/OK button 46 when there is no discrepancy in the page to be reproduced, and the user depresses the BACK button 42 when there is a discrepancy in the page to be reproduced.

The CPU 100 discriminates which of the menu/OK button 46 and the BACK button 42 is depressed (step S34), the CPU 100 returns to step 31 when the BACK button 42 is depressed, and photographs the two dimensional bar code 204 again.

When the menu/OK button 46 is depressed, the retrieval of the picture associated with the acquired page data is performed (step S35).

First, the CPU 100 sends the command for reading the management information to the read/write section 118, and acquires the management information from the wireless tag 210 provided for the notebook 200. Next, the CPU 100 acquires the file name of the picture file associated with the page data acquired from the two dimensional bar code 204, based on the acquired management information. Then, the CPU 100 reads out the picture of the acquired file name from the recording medium 114, and reproduces and displays the picture in the monitor 30 (step S36).

Here, in the case where there are a plurality of picture files associated with the page, the picture file recorded at first with association is reproduced and displayed in the monitor 30. Then, feeding of the picture frame is performed by pressing the right or left key of the cross button 48.

Thereby, it is possible to browse the picture file associated with the specific page of the notebook 200.

The reproduction is ended by depressing the BACK button 42, and the CPU 100 determines whether to terminate the reproduction of the picture (step S37) by discriminating whether the BACK button 42 is depressed or not. Then, when the CPU 100 determines that the BACK button 42 is depressed, the CPU 100 terminates the notebook picture reproduction mode and shifts to the normal reproduction mode.

Thus, the digital camera 10 is able to reproduce the picture associated with the specific page of the notebook 200 by setting to the notebook picture reproduction mode.

As described above, according to the digital camera 10 of the embodiment, a picture can be recorded and reproduced in association with each page of the notebook 200. As a result, a picture can be managed with a brief comment attached to the notebook 200, thereby facilitating the management of photographed pictures. The notebook 200 can also be used effectively.

Although the two dimensional bar code 204 for specifying each page is attached to each page of the notebook 200 in the embodiment, a two dimensional bar code may be attached to a medium, such as a memo pad, memo paper, a card, a sticker, a label, and a sheet other than the notebook, so as to be associated with a picture and recorded. For example, a two dimensional bar code may be attached to a business card so as to enable a picture to be recorded in association with the business card, and a two dimensional bar code may be attached to a sticker so as to enable a picture to be recorded in association with the sticker. When a two dimensional bar code is attached to a sticker, a picture can be stored in association with an article to which the sticker is attached.

Additionally, a two dimensional bar code may be attached to an article itself, so as to enable a picture to be recorded in association with the article.

Furthermore, the material of the medium is not limited to paper, and the medium may be constituted by a plastic, leather, cloth, and a metal, etc.

Although each page of the notebook is specified by using a two dimensional bar code in the embodiment, a normal bar code may also be used in specifying each page of the notebook. Similarly, a digital camera is provided with a recognizing capability of characters, so as to be arranged to specify a page based on the characters.

Although a date described in a page is used as the information to specify a page in the embodiment, a page number assigned to each page of the notebook etc., may also be arranged to be used other than the date.

Furthermore, although the management information is arranged to be stored in the wireless tag 210 provided for the notebook in the embodiment, the management information may be arranged to be stored in the digital camera 10, in the case where the combination of the notebook and the camera is fixedly used. That is, since it is not necessary to specify the notebook when the notebook and the digital camera are used in combination with a one-to-one correspondence, the management information may be arranged to be stored in the digital camera. In this case, the management information may be arranged to be stored in the EEPROM of the storage section 104. In the case where the management information is stored in the digital camera, the wireless tag at the side of the notebook and the read/write section at the side of the digital camera are not necessary.

Although the embodiment is exemplarily described a case in which the present invention is applied to a digital camera, the present invention can be similarly applied to a portable telephone provided with photography function. In the case where the invention is applied to a photographing apparatus having a moving picture photographing function, a moving picture may be recorded and reproduced in association with the notebook.

What is claimed is:

1. A photographing device comprising:
   an imaging device for imaging an object image in accordance with a photographing command;
   a reading device for reading a picture data recorded in a recording medium in accordance with a reproduction command;
   a display device for reproducing and displaying the picture data read by the reading device;
   an identifying data acquisition device for reading unique information attached in a medium and acquiring identifying data unique to the medium;
   a management information generation device for generating information indicating that an imaged picture data is a picture data corresponding to an identifying data acquired by the identifying data acquisition device when the identifying data are acquired by the identifying data acquisition device after the picture is imaged by the imaging device;
   a management information storing device for storing information generated as a management information by the management information generation device; and
   a reproduction control device for reproducing and displaying a corresponding picture data in the display device by acquiring an information of the picture data corresponding to the identifying data acquired by the identifying data acquisition device from the management information being stored in the management information storing device in accordance with a reproduction command after acquiring identifying data by the identifying data acquisition device.

2. A photographing device comprising:
   an imaging device for imaging an object image in accordance with a photographing command;
   a reading device for reading a picture data recorded in a recording medium in accordance with a reproduction command;
   a display device for reproducing and displaying the picture data read by the reading device;
   an identifying data acquisition device for reading unique information attached to a medium and acquiring identifying data unique to the medium;

a picture selection device for selecting an arbitrary picture data from the picture data reproduced and displayed in the display device;

a management information generation device for generating information indicating that a selected picture data is the picture data corresponding to the identifying data acquired by the identifying data acquisition device when acquiring the identifying data by the identifying data acquisition device and thereafter selecting the picture data by the picture selection device;

a management information storing device for storing information generated by the management information generation device as management information; and a reproduction control device for reproducing and displaying a corresponding picture data in the display device by acquiring an information of the picture data corresponding to the identifying data acquired by the identifying data acquisition device from the management information being stored in the management information storing device in accordance with a reproduction command after acquiring identifying data by the identifying data acquisition device.

3. The photographing device according to claim 1, wherein the medium is each page in a memo pad.

4. The photographing device according to claim 2, wherein the medium is each page in a memo pad.

5. The photographing device according to claim 3, wherein the management information storing device is a wireless tag provided for the memo pad.

6. The photographing device according to claim 4, wherein the management information storing device is a wireless tag provided for the memo pad.

7. The photographing device according to claim 5, further comprising:
a wireless tag reading device for reading the management information from the wireless tag in the photographing device; and
a wireless tag writing device for writing the management information into the wireless tag.

8. The photographing device according to claim 6, further comprising:
a wireless tag reading device for reading the management information from the wireless tag in the photographing device; and
a wireless tag writing device for writing the management information into the wireless tag.

9. The photographing device according to claim 1, wherein an information attached to the medium is a bar code, and the identifying data acquisition device comprises the imaging device for imaging the bar code and a decoding device for decoding the bar code imaged by the imaging device.

10. The photographing device according to claim 2, wherein an information attached to the medium is a bar code, and the identifying data acquisition device comprises the imaging device for imaging the bar code and a decoding device for decoding the bar code imaged by the imaging device.

11. The photographing device according to claim 1, wherein the medium is located outside of and not physically connected to the photographing device and the medium comprises the management information storage device.

12. The photographing device according to claim 1, wherein the unique information attached to the medium comprises information directly applicable to the picture data recorded in the recording medium.

13. The photographing device according to claim 1, wherein the unique information attached to the medium is captured and translated by the identifying data acquisition device such that the unique information is associated with the picture data recorded in the recording medium, the picture data being directly applicable to the unique information.

14. The photographing device according to claim 1, wherein the information generated as management information by the management information generation device comprises file names of the picture data recorded in the recording medium of the photographing device.

15. The photographing device according to claim 1, wherein the information generated as management information by the management information generation device comprises information directly applicable to the unique information in the medium.

16. The photographing device according to claim 1, wherein the identifying data acquisition device can identify faulty identifying data and request that correct identifying data be provided.

17. The photographing device according to claim 1, wherein the identifying data acquisition device comprises a digital camera that can be programmed to acquire and decode specific images and associate those decoded specific images with preexisting images already recorded in the recording medium of the digital camera.

18. The photographing device according to claim 17, wherein the digital camera has a capability of recognizing characters.

19. The photographing device according to claim 9, wherein the medium comprises a business card.

20. A method of using a photographing device to associate picture data with identifying data, comprising:
reading the picture data recorded in accordance with a reproduction command;
reproducing and displaying the picture data;
reading unique information attached in a medium and acquiring identifying data unique to the medium and applicable to the picture data; and
generating information indicating that the picture data corresponds to a portion of the identifying data acquired after reading the picture data.

* * * * *